No. 713,202. Patented Nov. 11, 1902.
I. BUSH.
SAND SCOOP AND ELEVATOR.
(Application filed Mar. 20, 1902.)
(No Model.) 2 Sheets—Sheet 1.

WITNESSES: J. O. Edson. M. L. Lange.

INVENTOR, Isaac Bush.
BY Higdon & Higdon, ATTORNEYS.

No. 713,202. Patented Nov. 11, 1902.
I. BUSH.
SAND SCOOP AND ELEVATOR.
(Application filed Mar. 20, 1902.)

(No Model.) 2 Sheets—Sheet 2.

WITNESSES:
J. O. Edson.
M. L. Lange

INVENTOR,
Isaac Bush.
BY
Higdon & Higdon, ATTORNEYS.

UNITED STATES PATENT OFFICE.

ISAAC BUSH, OF KANSAS CITY, KANSAS, ASSIGNOR OF ONE-HALF TO WILLIAM HEAGY, OF KANSAS CITY, MISSOURI.

SAND SCOOP AND ELEVATOR.

SPECIFICATION forming part of Letters Patent No. 713,202, dated November 11, 1902.

Application filed March 20, 1902. Serial No. 99,151. (No model.)

*To all whom it may concern:*

Be it known that I, ISAAC BUSH, a citizen of the United States, residing at Kansas City, in the county of Wyandotte and State of Kansas, have invented new and useful Improvements in Sand Scoops and Elevators, of which the following is a specification.

My invention relates to opening and closing scoops which are employed for removing sand from barges or sand-banks and are raised and lowered by cables connected to a crane.

The object of my invention is to produce a scoop that will take up its full capacity of sand at every operation, while the scoops in present use take up only about a third of their capacity at one operation.

Figure 5:
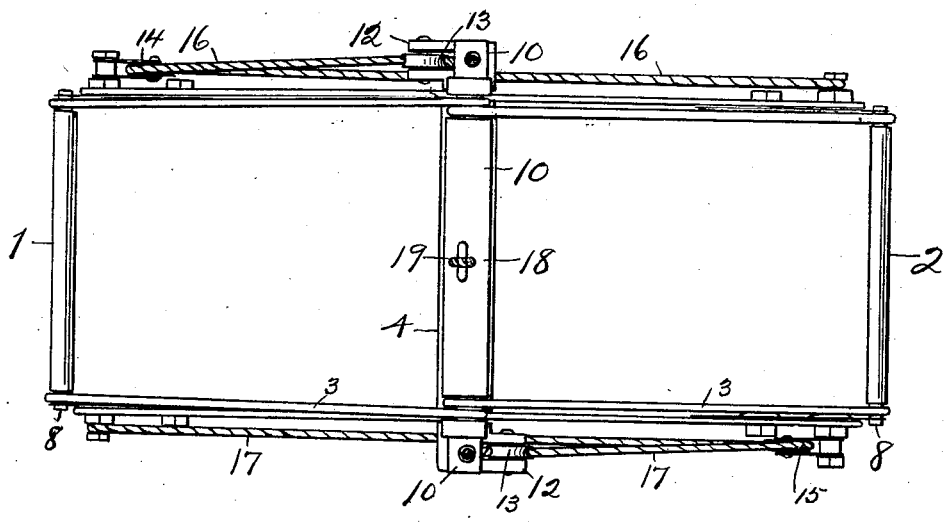
Figure 1:
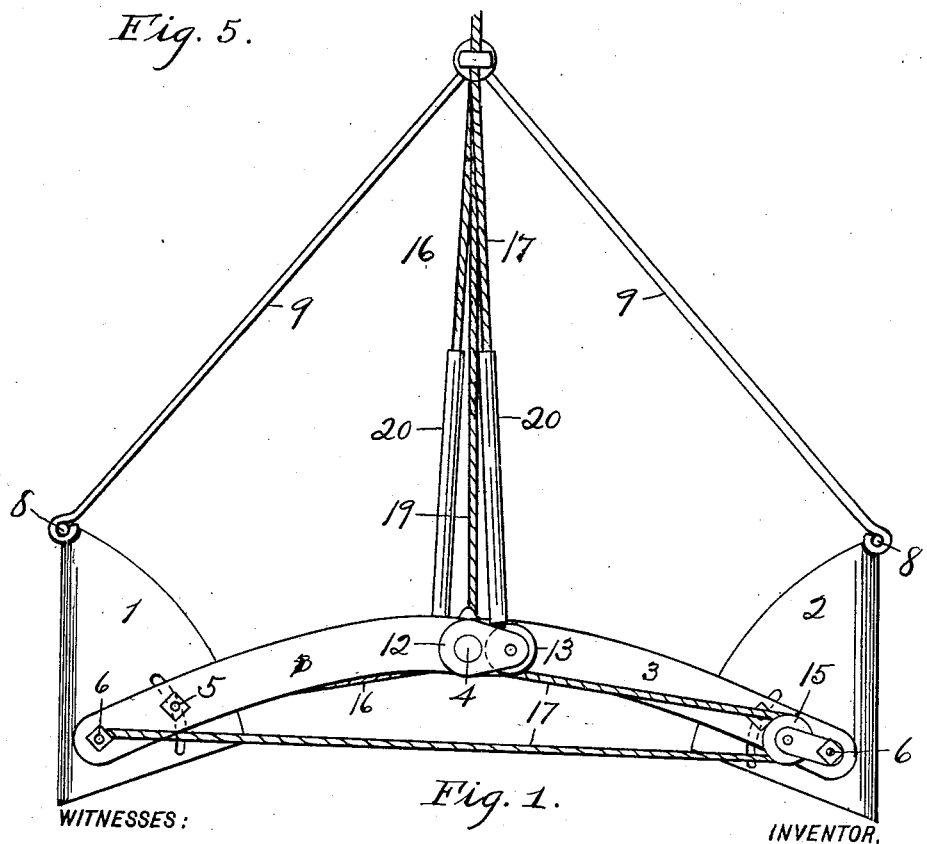
Figure 4:
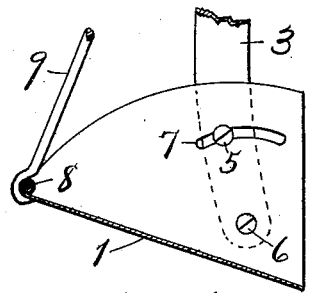
Figure 2:
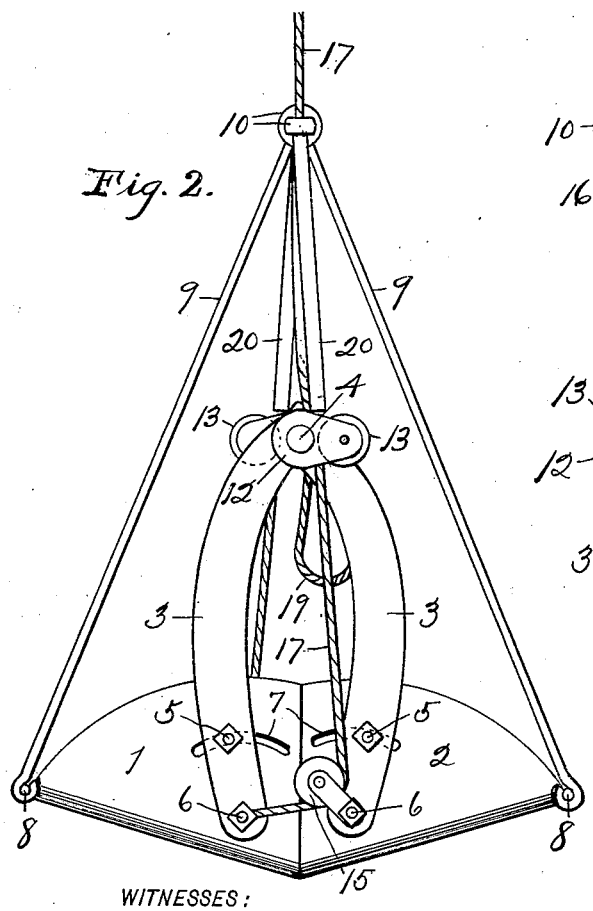
Figure 3:
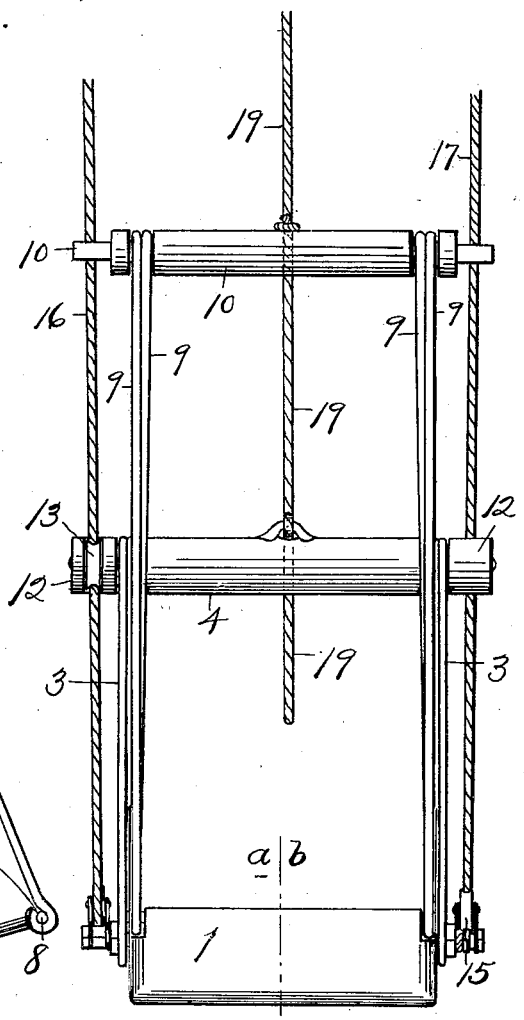

In the accompanying drawings, Figure 1 is a side elevation of a scoop constructed in accordance with my invention, the shovels fully separated. Fig. 2 is a side elevation showing the shovels together in hoisting position. Fig. 3 is an end elevation of the scoop in closed position. Fig. 4 is a section of one of the shovels, taken on line *a b* of Fig. 3. Fig. 5 is a top plan view of the scoop in closed position.

1 and 2 are the shovels, each shovel being secured to a pair of arms 3 3, which are pivotally secured on a center shaft 4. Each arm 3 is secured to a side of its shovel by two bolts 5 and 6. These bolts are flat-headed and are placed with their heads inside the shovels. Each bolt 5 passes through a curved slot 7 in the side of the shovel. The purpose of said slots is to permit pivotal adjustment of the shovels about the bolts 6. Before changing the angles of the buckets on the arms 3 the nuts on bolts 5 and 6 would of course be loosened to permit the adjustment, after which they are tightened up.

The upper edge of each shovel is curled around a transverse rod 8. Said rods are connected by oblique rods 9 to a cross-bar 10, each end of which is perforated. The connections of the rods 9 to the shovels are pivotal to permit the movements described hereinafter.

On each end of shaft 4 is secured a block 12, in which is mounted a grooved pulley 13. A grooved pulley 14 is mounted on one side of shovel 1, and a similar pulley 15 is mounted on the opposite side of the other shovel 2. 16 and 17 are the closing and hoisting cables. One of them descends through one of the perforated ends of cross-bar 10, passes around pulley 13, thence around pulley 14 on shovel 1, thence back across to the other shovel 2, to which it is fastened, attached, or connected. The other hoisting and closing cable descends through the perforation in the other end of cross-bar 10, passes around pulley 13, thence around pulley 15 on shovel 2, thence back and across to the other shovel 1, to which it is fastened. Said cables extend upward above the cross-bar 10 a suitable distance and pass over depending drums, thence to a hoisting-engine, neither of which being shown.

Secured to the middle of the shaft 4 is a portion of the opening-cable 19, which is also secured to the cross-bar 10, with enough slack between said cross-bar and shaft 4 to permit the meeting of the shovels 1 and 2. The longer portion of the opening-cable 19 is secured to cross-bar 10 and ascends to the usual winding-drum on the crane. (Not shown.)

On the closing-cables 16 and 17, resting on the blocks 12, respectively, are two pieces of pipe 20 of a length about one-third the vertical distance between the shaft 4 and cross-bar 10 when the shovels are extended, as shown in Fig. 1. While the shovels are being drawn together by the closing-cables 16 17, the shaft 4 of course rises, carrying up with it the pipes 20, the upper ends of which will meet the ends of the cross-bar 10, and thereby raise the latter, which throws the weight of the shovels mainly upon the rods 9. After the shovels have met the continued ascent of the closing and hoisting cables will raise the entire scoop, and after the scoop is swung around to the dumping-place by the crane the opening-cable 19 is drawn up, while the hoisting-cables 16 17 are held stationary. The result is that the shovels fall apart by their own weight and that of the arms 9.

The advantage of my scoop over those employing a winding-drum carried by the scoop (with closing-cables attached to said drum) is that in the latter so much upward-pulling force is required to rotate the drum to draw the shovels together that the weight of the scoop is greatly reduced by said force, and the effect of this is that the shovels are prevented from sinking deeply into the sand, as they should do, to take a heavy load. Thus they will take only light loads, which increase the cost of operation, as more trips have to be made. In my herein-described scoop there is no direct lift on the shovels until they are closed or nearly closed, and hence they will sink as deeply into the sand as their unopposed weight will cause.

Having now fully described my invention, what I claim as new, and desire to secure by Letters Patent of the United States, is—

1. A sand scoop and elevator comprising a shaft, two pairs of arms connected pivotally to said shaft, a shovel secured to and between each pair of arms, a cross-bar, two pairs of oblique rods depending from said cross-bar and secured to said respective shovels, an opening-cable secured to said shaft and to said cross-bar, a pulley on one side of each shovel, a pulley on each end of said shaft, and a pair of closing and hoisting cables having their lower ends secured to said shovels respectively, passing around the respective pulleys on said shovels, thence around the respective pulleys on the ends of said shaft, and united at a suitable distance above said cross-bar, substantially as described.

2. In a sand scoop and elevator, a shovel, an arm secured with two bolts to the side thereof; said side having a curved slot therein through which one of said bolts passes, to permit a tilting adjustment of the shovel, substantially as described.

3. A sand scoop and elevator comprising a shaft, two pairs of arms connected pivotally to said shaft, a shovel secured to and between each pair of arms, a cross-bar, two pairs of oblique rods depending from said cross-bar and secured to said respective shovels, an opening-cable secured to said shaft, and to said cross-bar, a pulley on one side of each shovel, a pulley on each end of said shaft, a pair of closing and hoisting cables having their lower ends secured to said shovels respectively, passing around the respective pulleys on the ends of said shaft extending a suitable distance above said cross-bar, and a piece of pipe surrounding a portion of each hoisting-cable, and supported by the pulley-blocks on the ends of said shaft, substantially as described.

In testimony whereof I affix my signature in the presence of two witnesses.

<div style="text-align:right">
his<br>
ISAAC × BUSH.<br>
mark
</div>

Witnesses:
K. M. IMBODEN,
PEARL DIEHL.